(12) United States Patent
Carrier

(10) Patent No.: US 8,763,248 B2
(45) Date of Patent: Jul. 1, 2014

(54) METHOD FOR MANUFACTURING AIRCRAFT ENGINE CASES WITH BOSSES

(71) Applicant: General Electric Company, Schenectady, NY (US)

(72) Inventor: Charles William Carrier, Ocala, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/654,156

(22) Filed: Oct. 17, 2012

(65) Prior Publication Data

US 2013/0064653 A1 Mar. 14, 2013

Related U.S. Application Data

(62) Division of application No. 10/975,313, filed on Oct. 28, 2004, now abandoned.

(51) Int. Cl.
*B21K 25/00* (2006.01)
*B23P 6/00* (2006.01)
*B23K 20/12* (2006.01)
*F01D 25/24* (2006.01)

(52) U.S. Cl.
CPC .............. *F01D 25/24* (2013.01); *B23K 20/129* (2013.01); *F05D 2250/292* (2013.01); *F05D 2230/232* (2013.01); *B23K 2201/001* (2013.01); *F05D 2230/10* (2013.01)
USPC ....... 29/889.2; 29/889.1; 29/889.21; 228/2.1; 228/113; 228/119; 228/165; 415/182.1

(58) Field of Classification Search
USPC .............. 29/889.1, 889.2, 889.21; 228/1, 2.1, 228/113, 119, 165; 415/2.1, 3.1, 108, 160, 415/189, 196, 201, 209.1, 209.3, 209.4, 415/214.1, 230; 416/213 R
See application file for complete search history.

(56) References Cited

U.S. PATENT DOCUMENTS

| 3,446,931 A | 5/1969 | Fuchino et al. |
| 3,487,530 A | 1/1970 | Ely |
| 3,558,237 A | 1/1971 | Wall, Jr. |

(Continued)

FOREIGN PATENT DOCUMENTS

| EP | 0486082 | 5/1992 |
| EP | 1329669 A2 | 7/2003 |

(Continued)

OTHER PUBLICATIONS

A Japanese language Preliminary Rejection for co-pending Japanese patent application No. JP2005-307936 (4 pages).

(Continued)

*Primary Examiner* — Alexander P Taousakis
(74) *Attorney, Agent, or Firm* — William Scott Andes, Esq.; Armstrong Teasdale LLP

(57) ABSTRACT

A method of manufacturing turbine engine casings having at least one boss includes, in one exemplary embodiment, forming an engine casing having an outer wall, machining a tapered opening through the casing outer wall, and machining a tapered portion in a metal plug where the tapered portion is sized to mate with the tapered opening in the casing outer wall. The method also includes inserting the metal plug into the tapered opening in the casing outer wall, and welding the metal plug to the casing.

7 Claims, 3 Drawing Sheets

(56) References Cited

U.S. PATENT DOCUMENTS

| | | | |
|---|---|---|---|
| 4,130,931 A | 12/1978 | Norcross | |
| 5,013,174 A | 5/1991 | Marabotto et al. | |
| 5,080,555 A | 1/1992 | Kempinger | |
| 5,111,570 A | 5/1992 | Baumgarten et al. | |
| 5,197,361 A | 3/1993 | Carrier et al. | |
| 5,609,362 A | 3/1997 | Sparks et al. | |
| 5,975,406 A | 11/1999 | Mahoney et al. | |
| 6,018,977 A | 2/2000 | Kanno et al. | |
| 6,138,896 A | 10/2000 | Ablett et al. | |
| 6,199,746 B1 | 3/2001 | Dupree et al. | |
| 6,230,958 B1 | 5/2001 | Coletta et al. | |
| 6,331,110 B1 | 12/2001 | Steber et al. | |
| 6,413,650 B1 | 7/2002 | Dupree et al. | |
| 6,454,156 B1 | 9/2002 | Taras et al. | |
| 6,457,936 B1 | 10/2002 | Leach et al. | |
| 6,460,750 B1 * | 10/2002 | Coletta et al. | 228/2.1 |
| 6,463,739 B1 | 10/2002 | Mueller et al. | |
| 6,553,769 B2 | 4/2003 | Halila et al. | |
| 6,615,470 B2 | 9/2003 | Corderman et al. | |
| 6,641,229 B1 | 11/2003 | Kosak | |
| 6,666,653 B1 | 12/2003 | Carrier | |
| 6,681,577 B2 | 1/2004 | Bolender et al. | |
| 6,883,700 B2 | 4/2005 | Kottlingham et al. | |
| 7,021,519 B2 * | 4/2006 | Foster et al. | 228/112.1 |
| 7,234,920 B2 | 6/2007 | Imbourgh et al. | |
| 7,559,203 B2 | 7/2009 | Stastny et al. | |
| 2003/0034379 A1 | 2/2003 | Jackson et al. | |
| 2003/0141344 A1 | 7/2003 | Foster et al. | |
| 2006/0174472 A1 | 8/2006 | Zhang et al. | |

FOREIGN PATENT DOCUMENTS

| | | |
|---|---|---|
| JP | 5297340 | 8/1979 |
| JP | 62113881 U | 11/1988 |
| JP | 238513 U | 10/1989 |
| JP | 2003232520 A | 8/2003 |

OTHER PUBLICATIONS

European Search Report dated Mar. 17, 2006, General Electric Company.

* cited by examiner

METHOD FOR MANUFACTURING AIRCRAFT ENGINE CASES WITH BOSSES

CROSS REFERENCE TO RELATED APPLICATIONS

This application is a divisional of application Ser. No. 10/975,313, filed Oct. 28, 2004, which is hereby incorporated by reference in its entirety.

BACKGROUND OF THE INVENTION

This invention relates generally to gas turbine engines, and more particularly, to manufacturing bosses on cases of gas turbine engines.

Gas turbine engines typically include an engine casing that extends circumferentially around a compressor, and a turbine including a rotor assembly and a stator assembly. The rotor assembly includes at least one row of rotating blades that extend radially outward from a blade root to a blade tip.

The manufacturing of engine casings include the incorporation of areas in the casing wall where the thickness is significantly increased. These areas, known as bosses, can include two different types, outside diameter biased, where all the added thickness is on the outer surface of the casing, and neutral biased, where the is approximately an equal amount of material on the inside surface as on the outside surface of the casing. Allowances are made for these features during the manufacturing of the forgings, castings, or fabricated structures for these parts. These allowances result in significant amount of excess material that is removed during the manufacturing process.

This problem has been addressed by attaching OD biased bosses to casings using inertia/friction welding techniques to weld a cylindrical piece to the outside surface of the casing. However, because of limited access to the inside of the casing, this method cannot be used to add material to the inside surface of the casing.

BRIEF DESCRIPTION OF THE INVENTION

In one aspect, a method of manufacturing turbine engine casings having at least one boss is provided. The method includes forming an engine casing having an outer wall, machining a tapered opening through the casing outer wall, and machining a tapered portion in a metal plug where the tapered portion is sized to mate with the tapered opening in the casing outer wall. The method also includes inserting the metal plug into the tapered opening in the casing outer wall, and welding the metal plug to the casing.

In another aspect, a method of manufacturing turbine engine casings having at least one boss is provided that includes forging an engine casing having an outer wall, machining a tapered opening through the casing outer wall, and machining a tapered portion in a metal plug, where the tapered portion is sized to mate with the tapered opening in the casing outer wall. The method also includes inserting the metal plug into the tapered opening in the casing outer wall, welding the metal plug to the casing, and machining the metal plug and at least a portion of the engine casing forging to form a boss on the casing outer wall.

In another aspect, a turbine engine casing is provided. The turbine engine casing includes an outer wall having a tapered opening extending therethrough; and a metal plug having a tapered portion located at least partially in the tapered opening. The tapered portion of the metal plug is mated with a side wall of the tapered opening in the casing outer wall.

In another aspect, a gas turbine engine is provided including a compressor, a high pressure turbine, and an engine casing extending circumferentially around the compressor and high pressure turbine. The casing includes an outer wall having a tapered opening extending therethrough, and a metal plug having a tapered portion located at least partially in the tapered opening. The tapered portion of the metal plug mating with a side wall of the tapered opening in the casing outer wall.

DETAILED DESCRIPTION OF THE INVENTION

A turbine engine casing having a boss and method of forming the boss is described in detail below. The boss is formed by machining a tapered opening through the casing wall, inserting a metal plug having a mating tapered portion, and welding the metal plug to the casing. The plug and casing is then machined to the desired configuration. The method of forming the boss provides for the use of lighter forgings or casings that are less expensive to produce, require less machining to manufacture, and permits more extensive use of conventional machining, for example, milling and turning.

Figure 1:
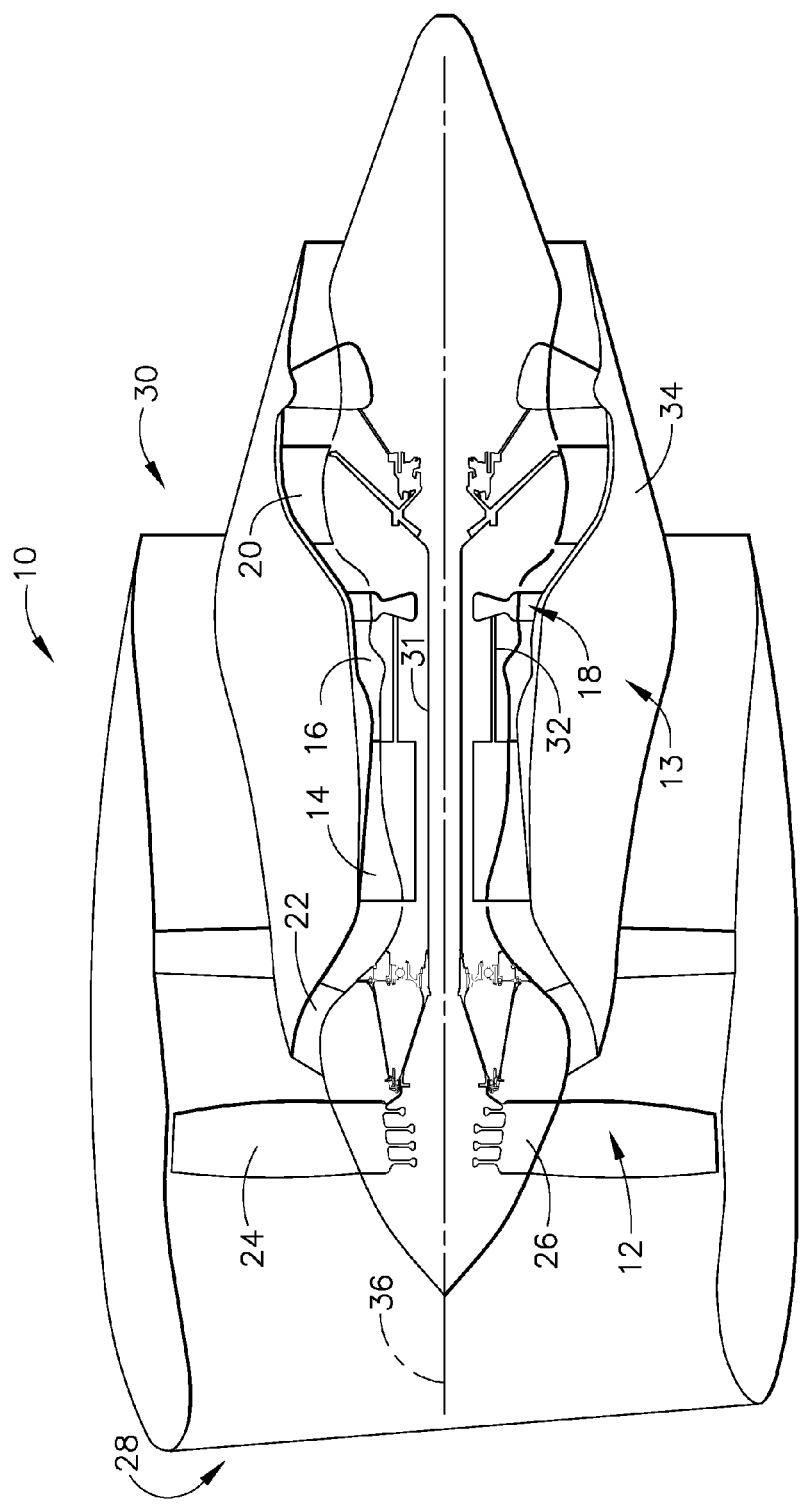
FIG. 1 is a schematic illustration of a gas turbine engine.

Referring to the drawings, FIG. 1 is a schematic illustration of a gas turbine engine 10 that includes a fan assembly 12 and a core engine 13 including a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disk 26. Engine 10 has an intake side 28 and an exhaust side 30. In one embodiment, the gas turbine engine is a GE90 available from General Electric Company, Cincinnati, Ohio. Fan assembly 12 and low pressure turbine 20 are coupled by a first rotor shaft 31, and compressor 14 and high pressure turbine 18 are coupled by a second rotor shaft 32. A casing 34 surrounds core engine 13.

During operation, air flows axially through fan assembly 12, in a direction that is substantially parallel to a central axis 36 extending through engine 10, and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31.

Figure 2:
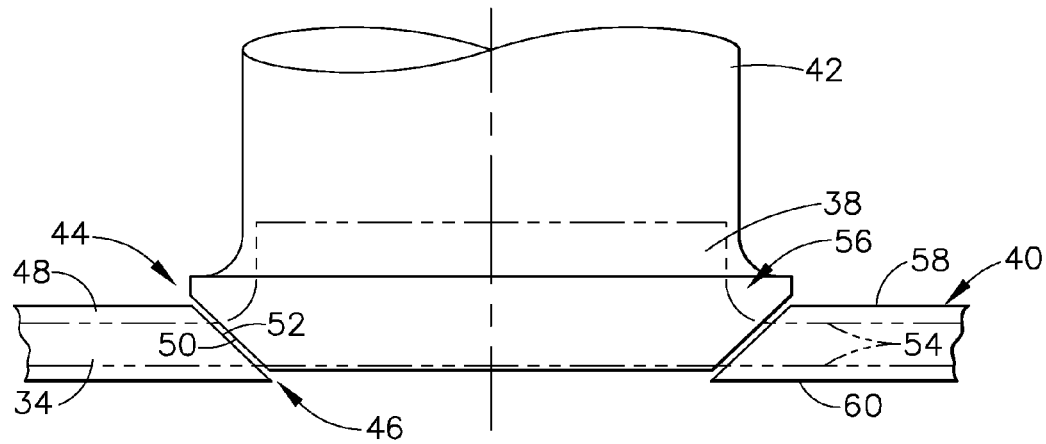
FIG. 2 is a schematic illustration showing an engine casing with a boss in accordance with an embodiment of the present invention.

FIG. 2 is a schematic illustration of a boss 38 in an engine casing forging 40 in an exemplary embodiment of the present invention. Boss 38 is formed from a cylindrical metal plug 42 having a tapered portion 44 that is sized to mate with a tapered opening 46 in an outer wall 48 of forging 40. Outer surface 50 of tapered portion 44 of plug 42 is welded to outer surface 52 of tapered opening 46 in outer wall 48 to form a unitary structure. Forging 40 and boss plug 42 are machined to a desired shape and size to form casing 34 and boss 38 which is represented by dotted line 54.

Any known method of machining can be used to form tapered portion 44 of metal plug 42. Also, any suitable method of welding metal plug 42 to outer wall 48 of forging 40, for example inertia/friction welding, can be used. To inertia weld metal plug 42 to outer wall 48, metal plug 42 is rotated to a predetermined speed and then outer surface 50 of tapered portion 44 of plug 42 is forced into frictional engagement with outer surface 52 of tapered opening 46 in outer wall 48 to form a weld between surfaces 50 and 52.

As shown in FIG. 2, boss plug 42 includes a portion 56 that is adjacent to tapered portion and that extends from an outer surface 58 of casing forging 40. After the final machining of casing 34, no portion of boss 38 extends beyond an inner surface 60 of casing 34 into the inside area of casing 34. This boss arrangement is sometimes referred to as an OD biased boss where all the added thickness from boss 38 is added to outer surface 58 of forging 40.

In the exemplary embodiment, casing 34 with boss 38 is fabricated by forming casing forging 40 with the thickness of outer wall 48 larger than the desired thickness of casing 34. Tapered opening 46 is machined into outer wall 48 with outer surface 50 tapered outward from inner surface 60 to outer surface 58 of forging 40. Tapered portion 44 of metal plug 42 is machined so that outer surface 50 of tapered portion 44 has the same taper as outer surface 52 of tapered opening 46 so that outer surfaces 50 and 52 mate when plug 42 is inserted into tapered opening 46. Plug 42 is inertia/friction welded to casing forging 40 by rotating plug 42 at a predetermined speed and moving outer surface 50 of tapered portion 44 of plug 42 into frictional engagement with outer surface 52 of tapered opening 46 in outer wall 48 to form a weld between surfaces 50 and 52. Forging 40 and boss plug 42 are then machined to a desired shape and size to form casing 34 and boss 38. In one embodiment, plug 42 is contoured to the desired shape before welding to forging 40 to minimize the final machining of forging 40.

Figure 3:
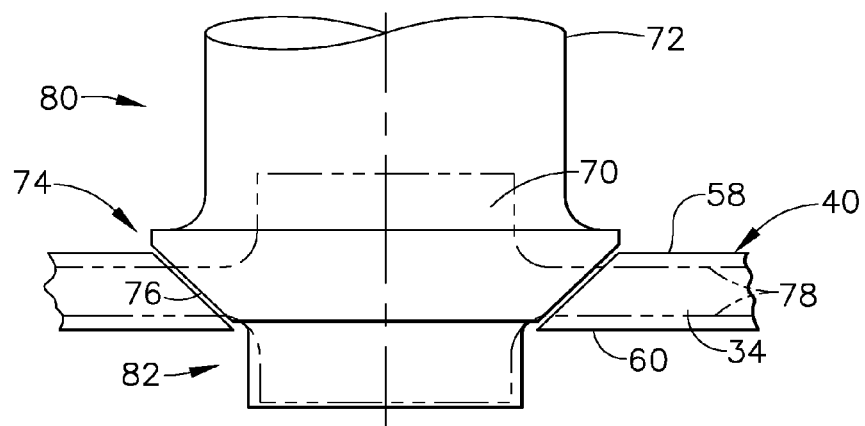
FIG. 3 is a schematic illustration showing an engine casing with a boss in accordance with an embodiment of the present invention.

FIG. 3 is a schematic illustration of another embodiment showing an engine casing 34 with a boss 70. Boss 70, similar to boss 38 described above, is formed from a cylindrical metal plug 72 having a tapered portion 74 that is sized to mate with tapered opening 46 in outer wall 48 of forging 40. Outer surface 76 of tapered portion 74 of plug 72 is welded to outer surface 52 of tapered opening 46 in outer wall 48 to form a unitary structure. Forging 40 and boss plug 72 are machined to a desired shape and size to form casing 34 and boss 70 which is represented by dotted line 78.

Boss plug 72 includes a first portion 80 that is adjacent to tapered portion 74 and that extends from outer surface 58 of casing forging 40. Boss plug 72 also includes a second portion 82 that is adjacent tapered portion 74 and that extends from inner surface 60 of casing forging 40 After the final machining of casing 34, first portion of boss 70 extends beyond outer surface 58 and second portion extends beyond inner surface 60 of casing 34 into the inside area of casing 34. This boss arrangement is sometimes referred to as neutral biased boss where roughly an equal amount of added thickness from boss 70 is added to outer surface 58 and inner surface 60 of forging 40.

Figure 4:
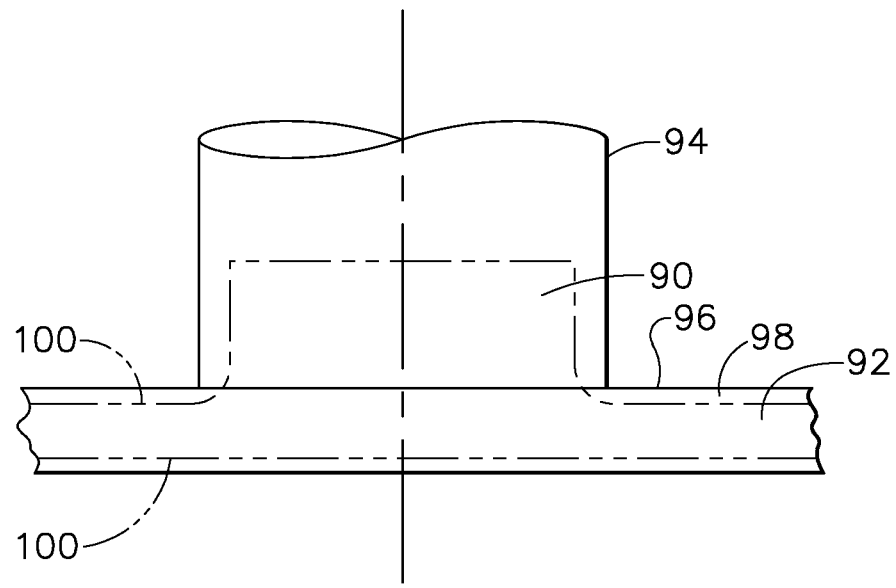
FIG. 4 is a schematic illustration showing a known method used to add bosses to engine casings.

FIG. 4 is a schematic illustration showing a known method used to add a boss 90 to an engine casing 92. A cylindrical piece of metal 94 is inertia/friction welded to an outer surface 96 of a casing forging 98. Forging 98 and metal piece 94 are machined to a desired shape and size to form casing 92 and boss 90 which is represented by dotted line 100. Because the inertia/friction welding process is limited by the weld area in contact during welding, the known method used to add boss 90 to engine casing 92 and shown in FIG. 4 limits the diameter of metal piece 94 that can be welded to forging 98.

The above describe exemplary method of fabricating casing 34 with boss 38 provides for the use of lighter forgings that are less expensive to produce, require less machining to manufacture, and permits more extensive use of conventional machining, for example, milling and turning. Also, because the contact area between boss plug 42 and tapered opening 46 is an annular area, it permits inertia/friction welding of bosses having larger diameters than the diameters of bosses in the known method illustrated in FIG. 4.

While the invention has been described in terms of various specific embodiments, those skilled in the art will recognize that the invention can be practiced with modification within the spirit and scope of the claims.

What is claimed is:

1. A method of manufacturing turbine engine casings having at least one boss, said method comprising:
    forming an engine casing having an outer wall;
    machining a tapered opening through the casing outer wall;
    machining a tapered portion in a metal plug, the tapered portion sized to mate with the tapered opening in the casing outer wall, wherein the metal plug includes first and second portions adjacent the tapered portion, and wherein the first portion is substantially cylindrical;
    inserting the metal plug into the tapered opening in the casing outer wall such that the first portion extends beyond an outer surface of the casing outer wall and the second portion extends beyond an inner surface of the casing outer wall; and
    welding the metal plug to the casing.

2. A method in accordance with claim 1 further comprising machining the metal plug to form a boss on the casing outer wall.

3. A method in accordance with claim 2 wherein the metal plug comprises a contoured shape that is similar to a predetermined shape of the boss, said machining the metal plug comprises machining the contoured shaped metal plug to the predetermined shape of the boss.

4. A method in accordance with claim 1 wherein welding the metal plug to the casing comprises inertia welding the tapered portion of the metal plug to the casing outer wall.

5. A method of manufacturing turbine engine casings having at least one boss, said method comprising:
    forging an engine casing having an outer wall;
    machining a tapered opening through the casing outer wall;
    machining a tapered portion in a metal plug, the tapered portion sized to mate with the tapered opening in the casing outer wall, wherein the metal plug includes first and second portions adjacent the tapered portion, and wherein the first portion is substantially cylindrical;
    inserting the metal plug into the tapered opening in the casing outer wall such that the first portion extends beyond an outer surface of the casing outer wall and the second portion extends beyond an inner surface of the casing outer wall;
    welding the metal plug to the casing; and
    machining the metal plug and at least a portion of the engine casing forging to form a boss on the casing outer wall.

6. A method in accordance with claim 5 wherein the metal plug comprises a contoured shape that is similar to a predetermined shape of the boss, said machining the metal plug comprises machining the contoured shaped metal plug to the predetermined shape of the boss.

7. A method in accordance with claim 5 wherein welding the metal plug to the casing comprises inertia welding the tapered portion of the metal plug to the casing outer wall.

* * * * *